United States Patent [19]

Tsai

[11] 4,423,198

[45] Dec. 27, 1983

[54] HIGH GREEN STRENGTH SYNTHETIC RUBBERS AND METHOD

[75] Inventor: Tom Tsai, Baton Rouge, La.

[73] Assignee: Copolymer Rubber & Chemical Corporation, Baton Rouge, La.

[21] Appl. No.: 422,881

[22] Filed: Sep. 24, 1982

Related U.S. Application Data

[63] Continuation of Ser. No. 303,870, Sep. 21, 1981, abandoned, which is a continuation-in-part of Ser. No. 208,570, Nov. 20, 1980, abandoned.

[51] Int. Cl.$^3$ .................... C08F 236/16; C08F 236/18
[52] U.S. Cl. .................................... 526/263; 523/332; 526/83; 526/215; 526/293; 526/310; 526/312
[58] Field of Search ................ 526/263, 293, 310, 312

[56] References Cited

U.S. PATENT DOCUMENTS

| | | | |
|---|---|---|---|
| 3,904,580 | 9/1975 | Lasis et al. | 260/42.47 |
| 4,005,053 | 1/1977 | Briggs et al. | 260/33.6 |
| 4,052,542 | 10/1977 | Wei et al. | 526/46 |
| 4,222,906 | 9/1980 | Briggs et al. | 260/5 |

OTHER PUBLICATIONS

CA, 87: 169039b.
CA, 87: 202860m.
CA, 88: 192487w.
CA, 84: 136975p.
CA, 87: 202880u.

*Primary Examiner*—Stanford M. Levin
*Attorney, Agent, or Firm*—McDougall, Hersh & Scott

[57] ABSTRACT

The preparation of synthetic rubbers characterized by high green strength and tack in which a polymerizable unsaturated tertiary amine and a polymerizable cross linking agent in the form of an organic compound containing active halogen groups are copolymerized with the rubber forming monomers.

18 Claims, No Drawings

HIGH GREEN STRENGTH SYNTHETIC RUBBERS AND METHOD

This is a continuation of application Ser. No. 303,870, filed Sept. 21, 1981, now abandoned, which in turn was a continuation-in-part of application Ser. No. 208,570, filed Nov. 20, 1980, now abandoned.

This invention relates to rubber compounds having improved green strength to enable processing to the desired shape before subjecting the rubber compound to cure or vulcanization.

Green strength is a term applied to the strength, cohesiveness and dimensional stability of rubber compounds before they are cured or vulcanized. Green strength becomes an important factor, for example, in the manufacture of radial tires where the flat belt formed of the rubber and reinforcing fibers is considerably deformed when expanded by blowing to conform the belt to the shape of the tire mold. The rubber compound must stretch for a considerable distance without necking or breaking and with the tension uniformly distributed to maintain uniformity in reinforcing fiber concentration during the stretching of the rubber to conform with the tire mold. Synthetic rubbers, such as SBR, NBR, polybutadiene rubbers, polyisoprene rubbers and the like and blends thereof, such as blends of SBR or NBR with polybutadiene, are faced with the problem of sufficient green strength and elongation for use in the manufacture of radial tires.

U.S. Pat. Nos. 4,052,542 and 3,904,580 described a method for improvement of the green strength of such rubbers by the incorporation of a tertiary amine group into the rubber as a commoner during polymerization and cross linking the modified rubber after it is formed with a dihalogen compound, such as dibromobutene-2, or dibromoxylene.

The problem that has been encountered in the processes described in the aforementioned patents is in undesirable commercial process complications leading to variable green strength and/or additional process steps.

Another factor which militates against commercial utilization of the described process for improving green strength resides in the pollution of the environment with irritating and lachrymatory effects of halogen and the like gases and fumes wherever the modified rubber is being produced at production plants, such as during coagulation and drying up processes.

It is an object of this invention to produce and to provide a method for producing a synthetic rubber which is characterized by improved green strength and tack without raising problems of the types heretofore described, and it is a related object to produce and to provide a method for producing a synthetic rubber of the type described in a simple and efficient manner and with conventional synthetic rubber forming and processing equipment.

It has been found, in accordance with the practice of this invention, that a synthetic rubber characterized by improved green strength and tack can be produced by copolymerization of one or more polmerizable tertiary amine compounds and one or more polymerizable cross linking agents containing one or more active halogen groups, along with the polmerizable rubber forming monomers whereby a rubbery interpolymer is produced containing sufficient cross linkages to provide the desired increase in green strength and tack. The type of cross linkages that are formed through the cross linking agent enables severance at elevated temperature and reformation at reduced temperature to enable processing of the interpolymer with reduced viscosity at elevated temperature, yet possessing the desired high green strength after processing before vulcanization.

The advantages of this invention are that no extra procedure and equipment are required for the incorporation of the crosslinkers, no lachrymatory effects of the crosslinkers during the production, no hydrolysis of crosslinkers at high temperature, and it can be prepared with the traditional emulsion SBR process.

The rubber forming monomers with which the polymerizable tertiary amines and the polymerizable cross linking agent may be copolymerized include the monomers for the preparation of conjugated diolefin rubbery polymers based upon $C_4$-$C_6$ diolefins such as polybutadiene, polyisoprene and rubbery polymers of such conjugates, diolefins, such as butadiene, 1,3-isoprene, piperylene and 2,3-dimethyl butadiene with such unsaturated monomers as styrene, a methylstryrene and the vinyl toluenes, or with an acrylonitrile and methacrylonitrile. The preferred polymers employed in the practice of this invention are the rubbery polymers of butadiene and styrene polybutadiene, (SBR), and butadiene acrylonitrile (NBR), alone or blended with polyisobutylene polymers.

The preferred rubbery SBR polymers employed as the base in the present invention have bound butadiene contents of from 60–97% by weight and preferably 70–90% by weight and bound styrene contents of from 40–3% by weight and preferably 30–10% by weight. The preferred NBR polymers formed as the base are rubbery polymers containing from 50–90% and preferably 60–85% by weight butadiene and 10–50% by weight and preferably 15–40% by weight acrylonitrile content.

The polymerizable tertiary amine monomers are copolymerized with the butadiene and styrene or butadiene and acrylonitrile or other rubber forming monomers. Suitable polymerizable monomers containing tertiary amine groups are represented by N,N-dimethyl-aminoethyl acrylate and N,N-dimethyl-aminoethyl methacrylate, or other dialkyl aminoalkyl acrylate or methacrylate.

The desired improvement in green strength can be achieved when the dialkyl aminoalkyl acrylate or methacrylate is substituted in whole or in part by other polymerizable tertiary amine monomers such as alkyl vinyl or allyl pyridine monomers, as represented by vinyl pyridine or other polymerizable tertiary amines, such as N,N-dialkyl amino alkenes and N,N-dimethylamino 1,4-butadiene, and that a marked improvement in green strength is experienced when dialkyl aminoallyl acrylate or methacrylate and a described vinyl pyridine are both present for copolymerization with the rubber forming monomers, as will hereinafter be described.

As the polymerizable cross linking agent incorporated as a polymerizable monomer with the rubber forming monomers and the tertiary amine, use can be made of vinyl benzyl chloride or bromide, or other active halides capable of addition polymerization through unsaturated carbon-carbon linkages, such as allyl or vinyl benzyl halides in which the halide is preferably bromide or chloride.

The polymerizable tertiary amine monomers are incorporated in an amount within the range of 0.5–100 millimoles and preferably about 1.0–50 millimoles of tertiary amine groups per 100 grams of rubber forming monomers.

The polymerizable cross linking agents can be incorporated in the polymerization medium in an amount within the range of 0.03–5% by weight and preferably within the range of 0.05–2.0% by weight of the rubber forming monomers and in the ratio of 0.03–10.0 halogen mole atoms per mole of tertiary amine.

Having described the basic concepts of the invention, illustration will now be made by way of the following non-limiting examples.

EXAMPLE 1

A 300 ml portion of water, 0.6 g KCl, 0.5 g sodium salt of polymerized alkyl naphthalene sulfonic acid, 0,016 g tetrasodium salt of ethylene diamine tetraacetic acid, 0.10 g sodium formaldehyde sulfoxylate, 80 ml soap solution, which contains 7.2% potassium soap of fatty acid and 2.8% potassium soap of rosin acid, 1.5 mol of activator solution, 64 ml styrene, 1.8 ml 30% dodecyl mercaptan in toluene, 2.0 g N,N-dimethylaminoethyl methacrylate (DMM), and a varying amount (see table below) of vinyl benzyl chloride (VBC) were charged to a throughly cleaned 28 oz. bottle. The activator solution was prepared by dissolving 1.25 g NaOH, 2.31 g ethylene diamine tetraacetic acid, and 2.0 g $FeSo_4$ $7H_2O$ in water to make up 100.0 ml. Then 164.0 g butadiene was charged to the bottle and the bottle was capped with selfsealable closure. The bottle was pressurized with 20 psi $N_2$ gas, and a 5 ml portion of freshly prepared 1.2% $Na_2S_2O_4$ solution was injected to the bottle to scavenge any residual oxygen. The bottle was tumbled on a turning wheel in a polymerizer at 5°–10° C. for 30 minutes before a 2.0 ml portion of 5% paramethane hydroperoxide in styrene solution was injected to the bottle to initiate the polymerization. The polymerization was carried out at 5°–10° C. to 70% conversion to form a stable latex and the reaction was shortstopped with 20 ml of 1% sodium dimethyl dithiocarbamate and 1% diethylhydroxylamine.

The unreacted butadiene was vented from the bottle and the unreacted styrene was stripped from the latex by steam distillation. The latex was then coagulated with 37.5 parts extending oil and 1.0 part alkylated-acrylated bis-phenolic phosphite antioxidant per 100 parts polymer by acid coagulation. The rubber coagulum was dried in an air circulation oven at 60±5° C. overnight. The rubber was then pressed to a 100 mil thickness slab and its green strength and 200/300% Δ modulus were determined from the stress-strain curve obtained with an Instron tester.

The results are tabulated as follows:

| No | DMM (parts/ 100 parts) | VBC (parts/ 100 parts) | Green Strength (psi) | 200/300% Δ Modulus (KPa) |
|---|---|---|---|---|
| 413-94A | 0 | 0 | 28.2 | −13 |
| B | 1.0 | 0.2 | 53.9 | +16 |
| C | 1.0 | 0.4 | 86.0 | +62 |
| D | 1.0 | 0.6 | 100.1 | +39.9 |
| E | 1.0 | 0.8 | 47.6 | −2 |
| F | 1.0 | 1.0 | 54.8 | +1 |
| SBR1778 | 0 | 0 | 28.1 | −18 |

It will be seen from the above results that both green strength and delta modulus increase with increasing amounts of vinyl benzyl chloride to a maximum when present in the ratio of 0.6 parts by weight per 1 part by weight of DMM and that increased green strength and modulus was experienced when both DMM and vinyl benzylchloride were incorporated in the ratio of 0.2–1 part by weight vinyl benzylchloride per 1 part by weight DMM per 100 parts by weight of rubber forming monomers.

EXAMPLE 2

A rubbery polymer was prepared in a pilot plant operation by polymerizing a monomer mixture of butadiene-1,3, styrene, dimethylaminoethyl methacrylate and vinylbenzyl chloride. The monomer mixture was emulsified in a stirred 500 gal. reactor. The recipe is given in the following table. The reaction was carried out at about 63% to about 72% conversion. Upon completion of the polymerization, the residual monomers were steam stripped from the latex in the conventional manner.

| Recipe | | |
|---|---|---|
| Component | Parts | Weight |
| Butadiene | 71 | 438.3 (lbs.) |
| Styrene | 29 | 174.9 (lbs.) |
| Dimethylaminoethyl methacrylate (DMM) | 1.2 | 7.2 (lbs.) |
| Vinylbenzyl chloride (VBC) | 0.4 | 2.4 (lbs.) |
| Paramenthane hydroperoxide | 0.075 | 408.6 gm |
| $C_{12}$ modifier (tertiary dodecyl mercaptan) | 0.16 | 449.3 gm |
| Mixed acid emulsifier (60% stearic acid 40% rosin acid) | 5.0 | 440.0 lbs. |
| Water | 200 | 773.6 lbs |
| KCl | .3 | in soap |
| Secondary emulsifier (sodium salt of polymerized alkyl naphthalene sulfonic acid) (Lomar LS) | 0.1 | .65 lb. |
| Sodium formaldehyde sulfoxylate (SFS) | .075 | 4.5 lbs (of 10% solution) |
| Versene (tetrasodium salt of ethylene diamine acetic acid) | 0.02 | .13 lb. |
| Sodium hydrosulfite (SHS) | .02 | 6.0 lb. (2% solution) |
| Activation (ferrous sulfate) | 1.5 | 9 lbs. |
| Shortstop (sodium dimethyl dithiocarbamate and 1% diethyl hydroxylamine) | .075 | 50 lbs. |
| Reaction time | 4½ hrs. | |
| Target temperature | 60° | |
| Final Mooney | ML (1 + 44) = 142 Equivalent to MS (1 + C) = 78 | |
| Results: Green strength 98.6 psi, and 200/300% Δ Modulus + 123 KPa compared to 25.9–33.1 psi and −9.4 to 13.8 KPa for controls. | | |

EXAMPLE 3

A polymer was prepared in a pilot plant operation utilizing a 500-gallon reactor. The recipe used is given in the following table. The reaction was carried out at about 50° F. to approximately 72% conversion. Upon completion of the polymerization, the residual monomers were steam stripped from the latex in the usual manner.

| Recipe | | |
|---|---|---|
| Component | Parts | Weight |
| Butadiene | 71 | 438.3 (lb.) |
| Styrene | 29 | 174.9 (lb.) |
| Dimethylaminoethyl methacrylate (DMM) | 1.0 | 6.0 (lb.) |
| Vinylbenzyl chloride (VBC) | 0.08 | 0.48 (lb.) |

-continued

| Component | Recipe Parts | Weight |
|---|---|---|
| Paramenthane hydroperoxide | .075 | 408.6 (gm.) |
| C$_{12}$ modifier (tertiary dodecyl mercaptan) | 0.22 | 617.8 (gm.) |
| Mixed acid emulsifier (72% stearic acid) (28% rosin acid) | 5.0 | 440 (lb.) |
| Water | 200 | 773.5 (lb.) |
| KCl | 0.3 | in soap |
| Secondary emulsifier (sodium salt of polymerized alkyl naphthalene sulfonic acid-Lomar LS) | 0.1 | in soap |
| Sodium formaldehyde sulfoxylate (SFS) | .075 | 4.5 (lb.) |
| Versene (tetrasodium salt of ethylene diamine acetic acid) | .02 | in soap |
| Sodium hydrosulfite (SHS) | .02 | 6 (lb.) |
| Activator (ferrous sulfate) | 0.8 | 4.8 (lb.) |
| Shortstop (sodium dimethyl dithiocarbamate and 1% diethyl hydroxylamine) | .075 | 50 |

Results: A reaction time of 4 hours produced a 54 Mooney ML (1+4) polymer with a green strength of 69.6 psi and 200/300% delta modulus of +71.8 KPa. This compared to controls based upon a polymer of butadiene-styrene in the above ratio having green strength of 28.5 psi and 200/300% delta modulus of +8.3 KPa.

A number of advantages are derived by the process and product of this invention. One important advantage is derived from the fact that the halogen cross linking agent is tied into the rubbery interpolymer with the result that the undesirable effect of halogen liberation into the atmosphere is substantially completely eliminated during subsequent working or processing of the interpolymer. This overcomes one of the objectionable features of the previous processes for improving green strength of SBR rubber, polybutadiene rubber and polyisoprene rubber.

In addition, copolymerization enables better utilization of the halogen cross linking agents thereby to permit usage of lesser amounts of such halogen components with corresponding improvement not only in the amount of halogen that can be released into the atmosphere but improvement is also experienced in the ultimate cost of the rubber by reason of the reduced amount of halogen cross linking agent required in order to obtain the improved green strength and tack.

EXAMPLES 4–8

Five latices were prepared as in Example 3, except that different varying amounts of vinylbenzyl chloride (VBC) (see table below) were used in the polymerization. The latices were coagulated and dried as described in Example 3. The rubber was mixed in a Brabender at 100° C. for 5 minutes and then pressed to a slab of approximately 0.10 inch thickness. The green strength and 200/300% delta modulus were determined from the stress-strain curve obtained from an Instron tester.

The results are tabulated as follows:

| Example | DMM (parts 100 parts) | VBC (parts 100 parts) | Green Strength (psi) | 200/300% Δ Modulus (KPa) |
|---|---|---|---|---|
| 4 | 0 | 0 | 24.5 | −2.2 |
| 5 | 1.0 | 0 | 26.5 | −0.1 |
| 6 | 1.0 | 0.10 | 48.8 | +23.2 |
| 7 | 1.0 | 0.08 | 47.3 | +17.8 |

-continued

| Example | DMM (parts 100 parts) | VBC (parts 100 parts) | Green Strength (psi) | 200/300% Δ Modulus (KPa) |
|---|---|---|---|---|
| 8 | 1.0 | 0.06 | 42.6 | +23.5 |

It can be concluded from the above results that green strength increases with the use of increasing amounts of VBC from 0.06 to 0/10 parts per 1 part by weight of DMM. A much larger increase is seen in increasing VBC levels from 0.06 to 0.08 parts than in increasing VBC levels from 0.08 to 0.10 parts.

In the above examples 4–8, the amount of DMM given is in parts by weight per 100 parts by weight of rubber forming monomers (styrene and butadiene) and the amount of VBC is also in parts by weight per 100 parts by weight of rubber forming monomers. On the weight basis, 1 gram of DMM per 100 grams of rubber forming monomers calculates out to 6.37 millimoles DMM per 100 grams of rubber froming monomers, while 0.08 gram of VBC calculates out to 0.524 millimoles VBC per 100 grams or 0.08% by weight of the rubber froming monomers.

By reason of the tie-in of the polymerizable cross linking agent with the polymerizable tertiary amine, the likelihood of the formation of the corresponding quaternary amine and cross linking agent is enhanced with corresponding benefit in the synthetic elastomer that is formed.

The interpolymer formed in accordance with the practice of this invention can be used alone but very often it is used in admixture with other natural rubber and/or other synthetic rubbers such as SBR rubber, NBR rubber, polybutadiene rubber, polyisoprene rubber, nitrile rubber and the like to impart improvement in green strength in the formed rubber compound.

It will be understood that changes may be made in the details of formulation and operation without departing from the spirit of the invention, especially as defined in the following claims.

I claim:

1. A method of producing synthetic rubbers characterized by high green strength and tack comprising interpolymerizing a rubber forming monomer selected from the group consisting of a diolefin selected from the group consisting of butadiene, 1,3-isoprene, piperylene, 2,3-dimethylbutadiene and said diolefin and an unsaturated monomer selected from the group consisting of styrene, alpha-methyl styrene, vinyl toluene, acrylonitrile and methacrylonitrile with one or more polymerizable unsaturated organic tertiary amines and one or more polymerizable unsaturated organic cross linking agents in the form of an organic compound containing active halogen groups, in which the tertiary amine is incorporated with the polymerizable rubber forming monomers in an amount within the range of 0.5–100 millimoles per 100 grams of rubber forming monomers and in which the cross linking agent is incorporated in the ratio of 0.03–10.0 halogen mole atoms per mole of tertiary amine.

2. A method as claimed in claim 1 in which the tertiary amine is incorporated in an amount within the range of 1.0–50 millimoles per 100 grams of rubber forming monomers.

3. A method as claimed in claim 1 in which the organic cross linking agent is incorporated in an amount within the range of 0.05–5 parts by weight per 100 parts by weight of rubber forming monomers.

4. A method as claimed in claim 1 in which the organic cross linking agent is incorporated in an amount within the range of 0.05–2.0 parts by weight per 100 parts by weight of rubber forming monomers.

5. A method as claimed in claim 1 in which the polymerizable tertiary amine is a dialkylamino alkyl acrylate or dialkylamino alkyl methacrylate.

6. A method as claimed in claim 1 in which the polymerizable tertiary amine is selected from the group consisting of diethyl aminoethyl acrylate, diethyl aminoethyl methacrylate, dimethyl aminoethyl acrylate, dimethyl aminoethyl methacrylate, dimethyl amino methyl acrylate, dimethyl aminomethyl methacrylate, vinyl pyridine, N,N-dialkyl amino alkenes and N,N-dimethyl amino-1,4-butadiene.

7. A method as claimed in claim 1 in which the polymerizable cross linking agent is an alkenyl benzyl halide.

8. A method as claimed in claim 1 in which the polymerizable unsaturated cross linking agent is selected from the group consisting of vinyl benzyl chloride, vinyl benzyl bromide, allyl benzyl chloride and allyl benzyl bromide.

9. A synthetic rubber characterized by high green strength and tack produced by the method of claim 1.

10. A synthetic rubber characterized by high green strength and tack comprising an interpolymer of rubber forming monomer selected from the group consisting of a diolefin selected from the group consisting of butadiene, 1,3-isoprene, piperylene, 2,3-dimethylbutadiene and said diolefin and an unsaturated monomer selected from the group consisting of styrene, alpha-methyl styrene, vinyl toluene, acrylonitrile and methacrylonitrile, an unsaturated polymerizable organic tertiary amine incorporated in an amount within the range of 0.5–100 millimoles per 100 grams of rubber forming monomers and a polymerizable unsaturated cross linking agent in the form of an organic compound having active halogen groups in the ratio of 0.03–10 halogen mole atoms per mole of the tertiary amine.

11. A synthetic rubber as claimed in claim 10 in which the rubber forming monomers are butadiene and styrene in the ratio in the rubber of 70–80 percent by weight bound butadiene to 30–10 percent by weight styrene.

12. A synthetic rubber as claimed in claim 10 in which the tertiary amine is ncorporated in an amount within the range of 1.0–50 millimoles per 100 grams of rubber forming monomers.

13. A synthetic rubber as claimed in claim 10 in which the organic cross linking agent is incorporated in an amount within the range of 0.03–5 parts by weight per 100 parts by weight of rubber forming monomers.

14. A synthetic rubber as claimed in claim 10 in which the organic cross linking agent is incorporated in an amount within the range of 0.05–2.0 parts by weight per 100 parts by weight of rubber forming monomers.

15. A synthetic rubber as claimed in claim 10 in which the polymerizable tertiary amine is a dialkylamino alkyl acrylate or dialkylamino alkyl methacrylate.

16. A synthetic rubber as claimed in claim 10 in which the polymerizable tertiary amine is selected from the group consisting of diethyl aminoethyl acrylate, diethyl aminoethyl methacrylate, dimethyl aminoethyl acrylate, dimethyl aminoethyl methacrylate, dimethyl amino methyl acrylate, dimethyl aminomethyl methacrylate, vinyl pyridine, N,N-dialkyl amino alkenes and N,N-dimethyl amino-1,4-butadiene.

17. A synthetic rubber as claimed in claim 10 in which the polymerizable cross linking agent is an alkenyl benzyl halide.

18. A synthetic rubber as claimed in claim 10 in which the polymerizable unsaturated cross linking agent is selected from the group consisting of vinyl benzyl chloride, vinyl benzyl bromide, allyl benzyl chloride and allyl benzyl bromide.

* * * * *